Oct. 18, 1966   J. W. ZOBEL   3,279,023
THREAD CUTTING APPARATUS
Filed March 6, 1964   2 Sheets-Sheet 1
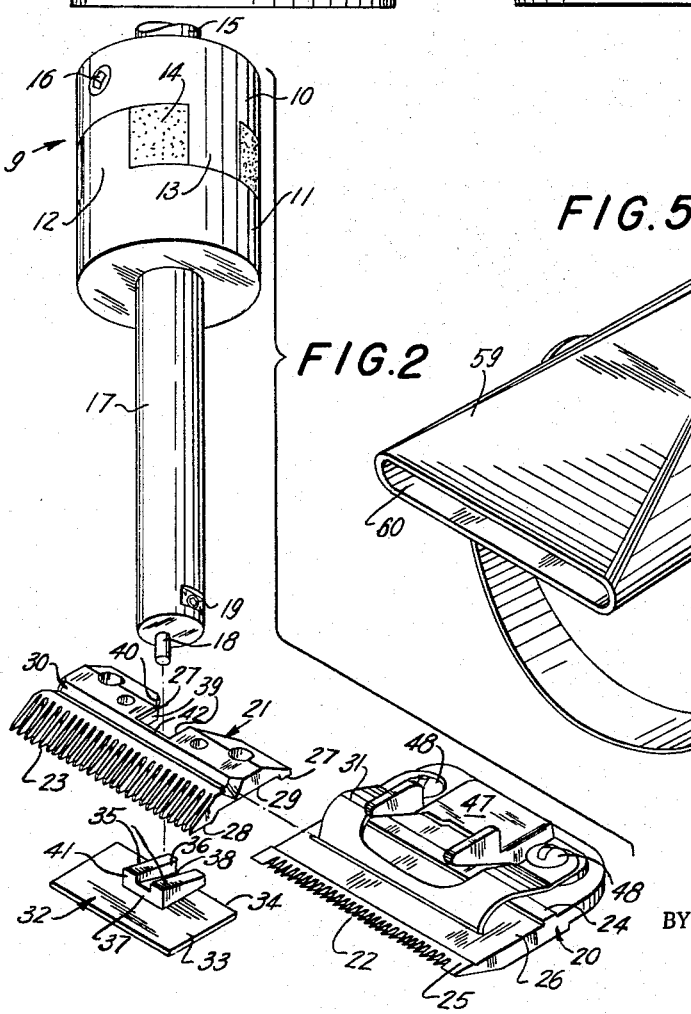
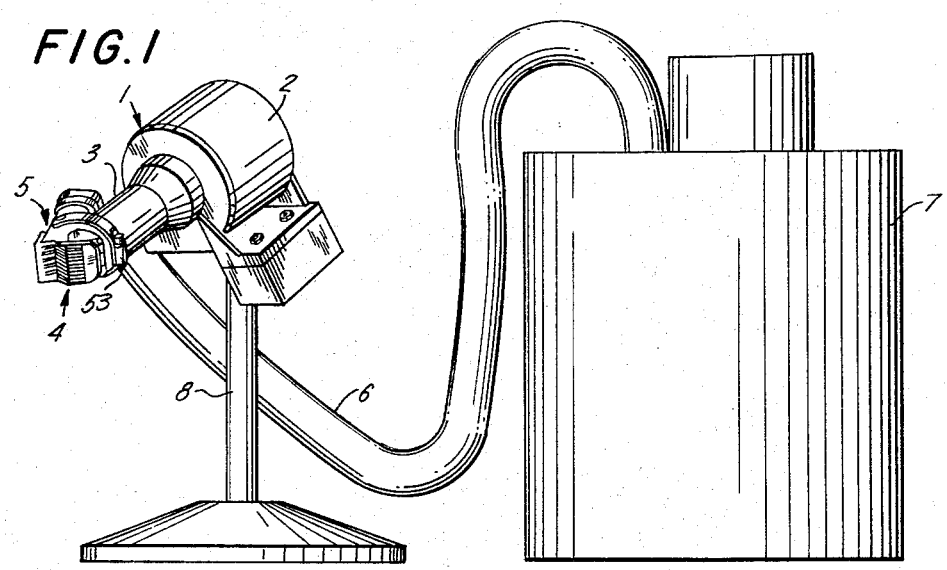
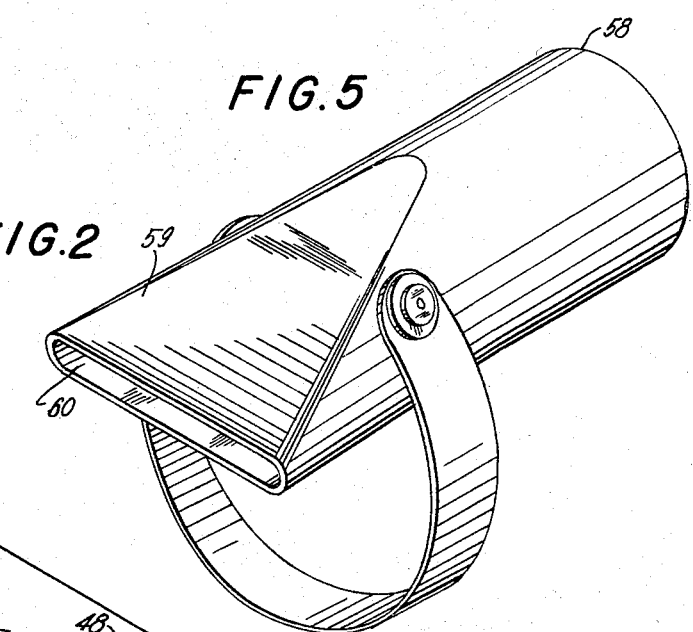
INVENTOR.
JAMES W. ZOBEL
BY
JULIAN H. COHEN
ATTORNEY

INVENTOR.
JAMES W. ZOBEL
BY
JULIAN H. COHEN
ATTORNEY

United States Patent Office 3,279,023
Patented Oct. 18, 1966

3,279,023
THREAD CUTTING APPARATUS
James W. Zobel, Box 125, Mount Kisco, N.Y.
Filed Mar. 6, 1964, Ser. No. 350,051
5 Claims. (Cl. 26—7)

This invention relates to cutting apparatus including novel drive means therefor. More particularly, the invention is directed to a thread trimming or cutting device which is directly driven from a motor.

It is known in the art to drive thread cutting apparatus from a motor by means of a flexible cable. The use of such a cable involves numerous disadvantages, among which are the power loss in the cable and the frequency with which the cables are subjected to breakage.

It is an object of the invention to directly drive the cutting apparatus from a motor without the use of a flexible cable.

It is a further object of the invention to provide a direct drive between a motor and thread cutting apparatus by means constituting a direct rigid connection between the motor and the cutting apparatus.

A still further object of the invention is to provide a compact portable thread cutter in which the motor is directly secured to a casing supporting the cutting apparatus which is directly driven from the motor solely by means of rigid members.

A still further object of the invention is to provide apparatus employing a minimum number of parts directly connecting the motor with the cutting apparatus to minimize wear and make replacement simple.

According to an embodiment of the invention, a single pin is directly driven from a motor to in turn drive cutting apparatus. According to a feature of the invention, the pin is replaceable without the necessity for dismantling the motor or disassembling the drive means which drives the pin.

It is yet another object of the invention to employ a suction device in conjunction with cutting apparatus for the purpose of drawing loose threads or the like in front of the cutting apparatus for severance thereby.

It is a feature of the invention that the suction device and the cutting apparatus cooperate in a novel manner for cutting loose threads or the like from material by the cutting device.

According to an embodiment of the invention there is provided a casing which is directly secured to the motor to constitute a single assembly therewith. A pair of blade members are supported from the casing, one of the members being a stationary blade member, the other being a movable blade member. Each of the blade members includes tooth elements which extend in a row and constitute cutting elements. According to the simplified drive for the blade members, there is contemplated a drive block which is supported between the blade members and which is adapted for driving the movable blade member in response to movement in the drive block of a pin which is directly driven from the motor.

The blade members include projections which have surfaces in sliding contact. The drive block is supported between the blade members and includes exposed spaced flanges defining a slot extending in a direction perpendicular to the sliding surfaces. The pin is eccentrically supported in a shaft and extends axially therefrom and is supported in the slot between the flanges. As the pin undergoes rotation, as a consequence of the driving of the shaft supporting the same, there is induced relative reciprocal movement between the blade members.

In accordance with a feature of the invention, the pin is detachably supported in a rigid shaft and the casing is provided with an opening through which means detachably supporting the pin in the shaft is accessible to permit replacement of the pin while the shaft remains supported within the casing. Therefore, a feature according to the invention is that the single element which drives the cutting blades can be readily removed for replacement. Furthermore, the compact nature of the assembly of the casing and the motor enables the trimmer to be readily portable.

In known manner, the casing with the cutting blades is brought into operative association with the material from which loose threads are to be severed. The material is passed beneath the cutting blades and a suction is developed adjacent the cutting blades for the purpose of raising the threads perpendicular to the blades so that the threads will be severed by the blades as the material passes the blades and the thus cut threads will be drawn away by the suction. While it is known to use a nose piece of comb-like arrangement for the purpose of guiding the threads to the cutting edges of the blades and preventing the material from being drawn into the suction device, the present invention provides an improved device in which the nose piece can be dispensed with and the blade members made to operate in conjunction with an open suction inlet. When light weight fabric is being trimmed it may be desirable to provide a plate, or the like, to restrict the material to a material passage zone which is spaced from the suction means to allow only loose threads from the material to pass to the suction means while preventing the material itself from so passing to the suction means.

Further features and objects of the invention will become apparent from a consideration of the embodiments shown in the attached drawing, wherein:

FIGURE 1 is a diagrammatic perspective view of the overall combination of the thread trimming apparatus according to the invention:

FIGURE 2 is an exploded view on an enlarged scale showing in perspective details of a portion of the drive of the trimming apparatus shown in FIG. 1;

FIGURE 5 shows in perspective on enlarged scale a second embodiment of the suction device.

Figures 3, 4:
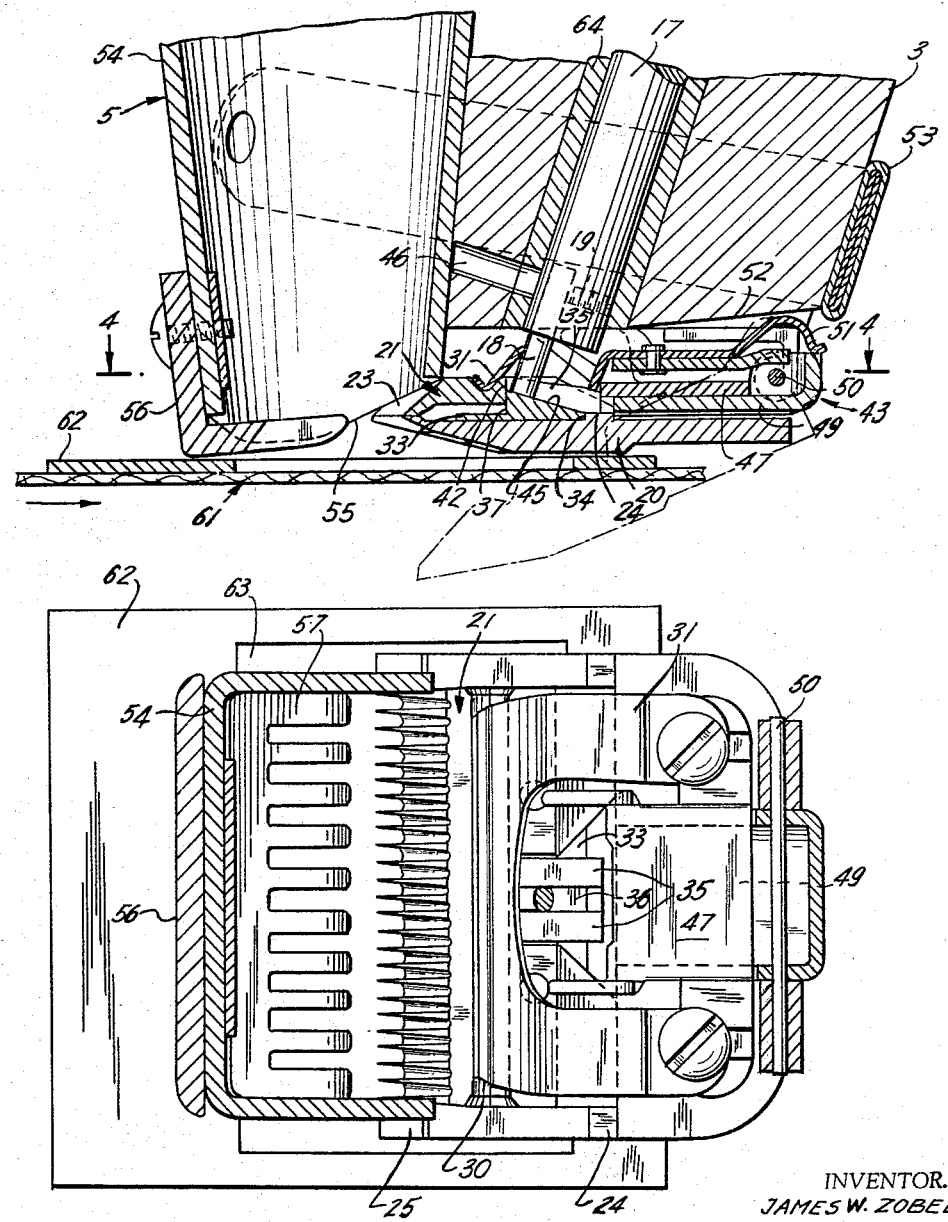
FIGURE 3 is an elevational sectional view on an enlarged scale of a portion of the apparatus shown in FIG. 1.
FIGURE 4 is a section taken along the line 4—4 in FIG. 3.

FIG. 1 shows the general overall arrangement of a portable thread trimmer. In this figure there is shown a casing and motor assembly 1 respectively constituted by a motor 2 and a casing 3. A blade assembly 4 is supported from the casing 3. The trimmer further includes a suction assembly 5 which is detachably supported from the casing 3. The suction assembly includes a flexible hose 6 which is connected to a container 7 which has a separate motor (not shown) therein for developing suction in the hose 6 and the assembly 5 to draw cut threads into the container. The trimmer is supported from a stand 8 which is adapted for resting on a table or similar support. In known manner the assembly 1 is adjustable on the stand 8 to bring the cutting assembly 4 into operative association with passing material for the purpose of severing loose threads therefrom. The trimmer is particularly adaptable for severing chain thread stitching from a garment as produced by an overlock hemming machine.

In FIG. 2 there is shown a clutch or connecting assembly 9 of known type constituted by opposed clutch or connecting members 10, 11, which have fingers 12, 13 which are adapted for engaging a resilient member 14 to provide a driving connection between elements 10 and 11. The drive shaft 15 of the motor (FIG. 2) is secured to member 10 by means of fastener 16. In a similar manner shaft 17 is secured to member 11. The shaft 17 and the drive shaft of the motor 15 are in axial alignment. The connecting assembly 9 provides a direct connection between the drive shaft 15 of the motor and the shaft 17. A pin 18 is eccentrically secured at the end of shaft 17 remote from the assembly 9 by means of a fastener 19 which is threadably secured in shaft 17 and is adapted to contact and secure pin 18 in shaft 17. The pin 18 extends in an axial direction from the shaft 17. When the fastener 19 is loosened, the pin 18 may be removed from the shaft 17. The connecting assembly 9 and shaft 17 are supported in casing 3 for rotation about an axis extending coaxially with shaft 17 and drive shaft 15. A bushing 64 is provided in the casing 3 for supporting the shaft 17.

The cutting assembly 4 includes a fixed blade member 20 and a movable blade member 21. The blade members are adapted for being driven by the pin 18 for relative reciprocal movement. The blade 20 includes a row of tooth elements 22 which constitute cutting elements. The movable blade 21 includes a row of tooth elements 23 which also constitute cutting elements and which are adapted for cooperating with the row of tooth elements 22 on the fixed blade 20 to perform a cutting operation. The movable blade is adapted for being driven in reciprocal manner in a direction parallel to the row of tooth elements to cause the tooth elements to cut material which is passed therebetween.

The blade member 20 includes projections 24, 25, which define therebetween an intermediate surface 26. The blade member 21 includes projections 27, 28, which define therebetween an intermediate surface 29. The projection 27 on the blade 21 has a surface which is slidably supported on a surface of the projection 24 on the blade 20. Similarly, the projection 28 on blade member 21 is slidably supported on projection 25 on blade member 20. The blade member 21 is provided with a V-shaped notch 30, and an elastic leaf spring 21 is resiliently supported in the V-shaped notch 30 to resiliently retain the movable blade member on the fixed blade member, with the projections in slidable contact. A drive block 32 is adapted for being driven by the pin 18 which is supported in the shaft 17, for in turn driving the movable blade member 21 in reciprocating fashion with respect to the fixed member 20. The drive block includes a flat plate 33 which is supported between the intermediate surfaces 26 and 29 of the blade members. The flat plate has an edge 34 which is in contact with the projection 24 on the fixed blade member 20. A pair of spaced flanges 35 extend upwardly from the plate 33 and define a slot 36 therebetween. A web 37 extends between the flanges and has an edge 38 which is flush with the surface of plate 33 at the edge 34. The web and flanges may be integral and may be integrally formed with the plate 33 or they may be secured to the plate 33 by means of known expedients such as welding, brazing, or the like. The flanges 35 laterally contact surfaces 39 in the blade member 21 which bound an opening 40 in the member 21. The flanges and web define a common end face 41 which is in contact with surface 42 which bounds the opening 40 in the movable blade member 21. Consequently, the drive block 32 is retained in position between the blade members such that the drive block is prevented from undergoing movement in a direction normal to the row of tooth elements. Additionally, since the flanges 35 are in contact with the surfaces 39 of the movable blade 21, any movement of the drive block in a direction parallel to the rows of tooth elements will cause concurrent movement of the movable blade member 21 therewith. The cutting assembly, including the fixed and movable blade members, is detachably supported from the casing by support means 43 for pivotal movement from an operative position shown in solid lines in FIG. 3 and an inoperative position as shown in dotted lines as will be discussed in greater detail hereinafter. The pin 18 in the operative position of the cutting assembly extends into the slot 36 formed between the flanges 35. The diameter of pin 18 is approximately equal to the width of slot 36 to be snugly fitted therein. As the shaft 17 undergoes rotation, the pin 18, by virtue of the eccentricity thereof in the shaft 17, causes the drive block 32 to undergo reciprocating movement in a direction parallel to the row of tooth elements. The movable blade member 21 is made to undergo corresponding reciprocal movement along with the drive block 32, and the rows of tooth elements thereby undergo relative reciprocal movement to sever threads passed between the tooth elements.

The flanges 35 are tapered and have a maximum height at an intermediate location on the drive block. The surface 45 of the web is tapered and extends approximately perpendicular to the axis of rotation of shaft 17. A maximum bearing surface at edge 37 is therefore provided for the drive block for contacting surface 42 of the movable blade member 21. Moreover, the edge of pin 18 moves approximately parallel to surface 45 as the pin revolves when the shaft 17 is rotated. The flanges 35 project above the web a sufficient distance to retain the pin 18 in the slot 36 between the flanges, for the entire length of the slot which corresponds to the maximum stroke of the blade members. The stroke of the blade members is controlled by the magnitude of the eccentricity of the pin. The larger the eccentricity, the larger the stroke. If it is desired to change the stroke of the blades, the shaft 17 is replaced with another shaft having a pin supported therein at a different eccentricity corresponding to the desired stroke. The pins are interchangeable between shafts. It is also possible to employ a shaft having a plurality of openings of different eccentricities, the pin being secured in the particular opening corresponding to the desired eccentricity.

A radial opening 46 extends through the casing 3 and the bushing 64 to provide access to member 19 which is threadably secured in shaft 17 and which retains pins 18 within shaft 17. Thus, with the suction assembly 5 removed from the casing 3, and the blade assembly lowered to its inoperative position the pin 18 may be replaced in the shaft 17 by loosening member 19. It is of significance to note that the pin 18, which is the driving connection between the shaft 17 and the movable blade 21, can be removed without detaching the assembly 1 constituted by the motor 2 and the casing 3 and without disturbing connecting means 9, shaft 17 and shaft 15. It is, therefore, a simple matter to replace the pin 18, which is the element requiring most frequent replacement. The drive block 32 can be replaced if necessary by removing the blade assembly from the casing (as will be described hereinafter) and by sliding the movable blade member along the projections 24, 25, parallel to the tooth elements until the blade elements are separated and the slide block is freed. This may be easily accomplished manually when the cutting assembly has been detached from the casing. If desired, the slide block may be secured to the movable blade 21 by a fitting which is connected to the slide block and which employs the holes on either side of the opening 40 in the movable blade member 21 to secure the fitting thereto.

The cutting assembly 4 is detachably secured to the casing 3 by the employment of means 43 on casing 3 in the following fashion. A plate member 47 is secured to the fixed blade 20 by means of screws 48 which also secure spring 31 to fixed blade 20. The plate member 47 defines a space with the upper surface of blade member 20 (FIG. 3), in which is slidably accommodated a tongue 49 which is supported about a shaft 50 for pivotal movement between the operative position shown in solid lines in FIG. 3, and the position shown in dotted lines in which the cutting assembly 4 constituted by the blade members and drive block may be merely slid as a unit from the tongue 49. The tongue is biased by a spring 51 which causes the tongue to be snapped between the operative position and the inoperative position. In the latter position, the drive block is free from the pin 18.

In operation: when it is desired to remove the cutting assembly from the casing 3, the cutting assembly is manually engaged at the lateral edges thereof and urged in a direction away from the casing to cause the tongue 49, which is accommodated between plate 47 and the blade member 20, to be pivotally moved about shaft 50 to the position shown in dotted lines. The spring 51 acts to snap the cutting assembly 4 into the inoperative position as the cutting assembly is moved towards this position. When the cutting assembly has been moved to the inoperative position, the cutting assembly 4 may be merely slidably removed from the tongue 49. To replace the cutting assembly it is only necessary to completely engage the tongue 49 in the opening between plate 47 and blade member 20 and snap the cutting assembly 4 into the operative position shown in solid lines in FIG. 3. If the pin 18 is not aligned with the slot 36 when the cutting assembly is snapped to the operative position, the pin will contact a flange 35. When the drive shaft is subsequently rotated, the pin 18 will register with the slot 36 and the spring 51 will act on the cutting assembly to cause the pin 18 to be seated in slot 36. The support means 43, inclusive of tongue 49, shaft 50 and spring 51, is secured on the inclined face 52 of the casing, such that the slot 36 in the drive block can accommodate the pin 18. The blade members extend approximately parallel to the face 52 of the casing when the cutting assembly is in the operative position.

Detachably secured to the casing is a suction assembly 5. This assembly may be detachably connected to the casing by an adjustable and detachable collar assembly 53 (FIG. 1). The suction assembly comprises a tube 54 connected to hose 6, which is adapted for having suction developed therein. The suction tube 54 has an inlet 55 and the tooth elements of the blade members extend at least partially across the inlet 55. As the material passes the trimmer, in a direction indicated by the arrow in FIG. 3, loose threads on the material are drawn upwardly into the suction tube so that further advancement of the material will cause the loose threads to be severed from the material by the tooth elements of the cutting members. A nose piece 56 is detachably supported on the suction tube 54. The nose piece includes comb elements 57, which are adapted to direct and guide the thread into the suction tube and prevent the material itself from being drawn into the suction tube.

According to a further embodiment of the invention, the suction tube 54 may be replaced by the suction tube 58 shown in FIG. 5, which has a bevelled end 59 defining a reduced flattened inlet 60. By employing tube 58, the tooth elements of the blade members will cover almost the entire inlet 60, and the nose piece 56 may be dispensed with.

As another expedient against drawing the material itself into the suction inlet, there is contemplated means operatively positioned with respect to the casing for defining a material passage zone 61, spaced from the suction tube, to allow only loose threads from the material to pass into the suction tube. Such means is inclusive of plate 62, which is supported between the material and the suction tube to prevent the material from itself being drawn into the suction inlet. The plate 62 may be employed in conjunction with the tube 54, with or without the nose piece 56 thereon. It will be understood that the material which is to be trimmed in many cases is frequently considerably larger than the area defined by the tooth elements of the blade member of the cutting assembly. By means of the plate 62 the material is restricted to pass in the material passage zone 61 beneath the suction inlet. The plate 62 is provided with an opening 63, which may be of a size related to the particular material being trimmed in terms of the weight and density thereof. The opening 63 permits the threads to be drawn into the suction inlet in order to position the threads for subsequent cutting by tooth elements of the blade member and removal of the thus cut threads. The opening 63 is shown in FIG. 4 as extending transversely beyond the tooth elements. However, this opening may be substantially reduced if it is desired to merely trim a narrow line, such as is the case when a chain of stitches is to be severed from a passing garment. The plate 62 may be slotted to define a slotted opening 63 when light-weight fabric is being trimmed. Alternatively, the opening may be covered with a screen, which is secured to the plate.

It will be seen from the above that there has been provided improved cutting apparatus which comprises a pair of blade members, having aligned rows of tooth elements constituting cutting elements, which blade members are supported for relative movement in a direction parallel to the rows of teeth to effect a cutting function on material positioned between the teeth of the blade members. The cutting apparatus further comprises a motor 2 constituting means for delivering power and means engaging one of the blade members and constituting a direct rigid connection between the means for delivering power and the said one blade member to directly drive the latter and provide relative reciprocal movement between the blades.

In the described apparatus the drive block is retained between the blade members and is in contact with the blade members to drive the movable blade member therewith under the action of the pin 18 which is revolvably driven about an axis which is concentric with the drive shaft of the motor.

A rigid and dependable construction has been set forth in which the number of moving parts has been kept to a minimum. Furthermore, the pin and drive block, which are the elements that constitute the driving connection between the shaft 17 and the cutting assembly, are readily replaceable.

Numerous modifications and variation of the disclosed embodiments will become readily apparent to one skilled in the art, without departing from the scope and spirit of the invention. Such modification for example may include forming the movable blade member 21 and the drive block 33 as an integral unit. It is also possible to merely provide a slot in the movable blade member which corresponds to the slot 36 between the flanges 35 thereby dispensing with the drive block itself. It is to be understood however that the drive block constitutes a preferable embodiment of the invention.

What is claimed is:

1. Cutting apparatus comprising an assembly including a motor and a casing secured to the motor, a shaft supported in said casing for rotation about an axis and adapted for being coupled to said motor to be directly driven therefrom, a pin, means detachably supporting the pin in the shaft such that the pin extends axially and eccentrically from said shaft to a position outside the casing, a cutting assembly pivotally supported on said casing and including first and second blade members each having a row of tooth elements, said second blade member being retained on the first blade member with the rows of tooth elements of said blade members adjacent one another, said second blade member being retained on the first blade member for sliding movement in a direction parallel to the rows of tooth elements and drive block means retained between said blade members and including a pair of exposed spaced flanges facing the pin extending from said shaft, said flanges extending perpendicular to the direction of sliding of the second blade member and defining a slot therebetween, said pin extending into said slot between the flanges, said flanges being each in engagement with second blade member to move the second blade member reciprocally with respect to the first blade member as the shaft undergoes rotation, said cutting assembly being pivotably movable on said casing from a first operative position wherein said pin is engaged in said slot to a second inoperative position away from said pin, said casing being provided with an opening which provides access to the means which detachably supports the pin in the shaft to permit said pin to be replaced in the shaft from outside the casing when the cutting assembly has been moved to its inoperative position.

2. Apparatus as claimed in claim 1 wherein the means detachably supporting the pin in the shaft comprises a radial member threaded in said shaft for contacting and securing the pin in the shaft.

3. Cutting apparatus comprising an assembly including a motor and a casing secured to the motor; a shaft supported in said casing for rotation and adapted for being coupled to said motor to be directly driven therefrom; a pin, means detachably supporting the pin eccentrically in the shaft with the pin extending in an axial direction from said shaft to a position outside the casing; a cutting assembly pivotally supported on said casing and including first and second blade members, each having a row of tooth elements, said second blade member being retained for sliding movement on the first blade member with the tooth elements adjacent one another, said blade members each including a pair of corresponding spaced marginal projections extending parallel to the respective row of tooth elements, said marginal projections of the blade members having corresponding surfaces in sliding contact and defining between said projections spaced intermediate surfaces for the blade members, said second blade member having an opening which is defined at least in part by parallel spaced surfaces extending perpendicular to the projections and by a surface extending between the latter mentioned surfaces, parallel to the projections, a drive block including a flat plate retained between said intermediate surfaces of the blade members, a pair of spaced flanges on the flat plate extending through said opening in the second blade member and in a direction perpendicular to the rows of tooth elements, each flange being in lateral contact with a corresponding surface of the second blade member which extends perpendicular to the projections and defines the opening in the second blade member, said drive block further including a web between the flanges, said web and flanges having edges lying in a plane which extends parallel to the rows of tooth elements, said edges being in contact with the surface of the second blade member which extends parallel to the projections and bounds the opening in the second blade member, said flat plate having an edge in contact with one of the marginal projections of the said first blade member whereby said drive block is secured without attachment by the blade members against movement in a direction perpendicular to the rows of the tooth elements, said flanges defining a slot therebetween, the apparatus further comprising means pivotably supporting the cutting assembly from the casing for movement between a first operative position and a second inoperative position, said pin in said first position of the cutting assembly being accommodated in the slot between the flanges for moving the drive block and the second blade member therewith reciprocally with respect to the first blade member as the shaft undergoes rotation, said casing being provided with an opening which provides access to the means which detachably supports the pin in the shaft to permit said pin to be replaced in the shaft from outside the casing when the cutting assembly has been moved to its inoperative position.

4. Apparatus as claimed in claim 1 wherein said drive block means is constituted by a block comprising a flat plate supported between the blade members, said flanges projecting upwardly from said flat plate and commencing from a location intermediate the length of the plate and extending to a position beyond the rear edge of the plate, and a web on said plate extending between the flanges.

5. Apparatus as claimed in claim 1 comprising suction means supported on said casing and having an inlet over which partially extends the tooth elements of the blade members, such that threads to be severed from the materials are drawn by the suction means in front of the tooth elements of the blade members for severence thereby said suction means comprising a suction tube having a beveled end defining a reduced flattened inlet, said tooth elements extending over a portion of the inlet.

References Cited by the Examiner

UNITED STATES PATENTS

| | | | |
|---|---|---|---|
| 1,586,924 | 6/1926 | Undeland et al. | 30—223 |
| 1,618,713 | 2/1927 | Kaufmann. | |
| 1,729,332 | 9/1929 | Dremel | 30—223 |
| 1,956,042 | 4/1934 | Oster. | |
| 2,332,557 | 10/1943 | Carillo et al. | 26—11 |
| 2,356,378 | 8/1944 | Capolupo | 26—7 |
| 2,584,620 | 2/1952 | Rubin | 26—7 |
| 2,607,101 | 8/1952 | Stout | 26—11 |
| 2,641,833 | 6/1953 | Need | 30—223 |
| 2,661,519 | 12/1953 | Rubin | 26—11 |
| 2,669,765 | 2/1954 | Auton | 26—11 |

ROBERT R. MACKEY, *Primary Examiner.*